Aug. 29, 1961  A. T. KOLTHOFF ET AL  2,997,790
DEVICE FOR LAYING OUT SLEEVES
Filed June 5, 1958  2 Sheets-Sheet 1

INVENTORS
Aage Thorwald Kolthoff
Hubert Louis Taylor

Aug. 29, 1961  A. T. KOLTHOFF ET AL  2,997,790
DEVICE FOR LAYING OUT SLEEVES
Filed June 5, 1958  2 Sheets-Sheet 2
FIG. 5
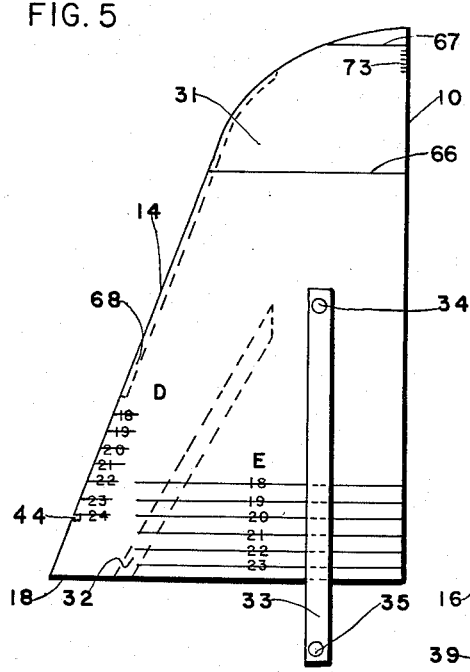
FIG. 6
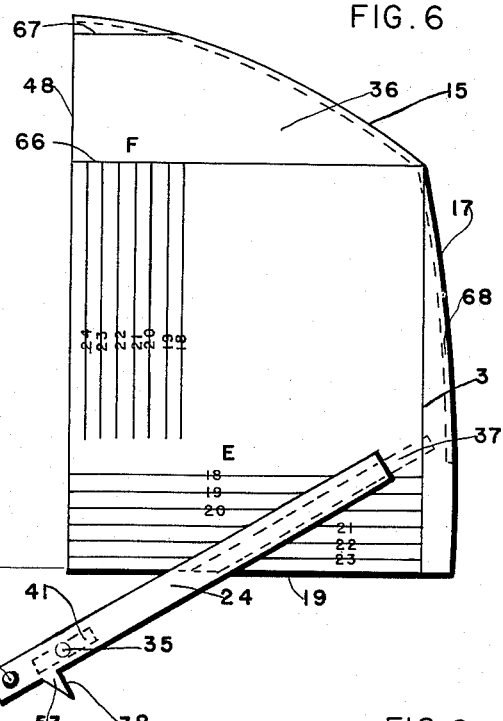
FIG. 7
FIG. 8
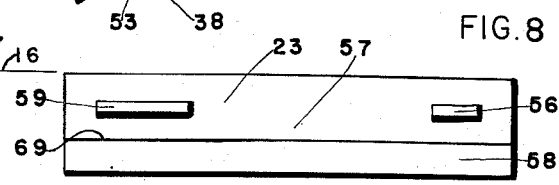
INVENTORS
Aage Thowald Kolthoff
Hubert Louis Taylor

# 2,997,790
DEVICE FOR LAYING OUT SLEEVES Aage Thorvald Kolthoff, New York, N.Y. (P.O. Box 146, Patton Ave., Wyandanch, N.Y.), and Hubert Louis Taylor, New York, N.Y. (206 Hancock St., Brooklyn, N.Y.)
Filed June 5, 1958, Ser. No. 740,089
7 Claims. (Cl. 33—14)

This invention pertains to tailoring devices used to design and lay out the sleeve part of a coat or overcoat. The objects of this invention are to provide a device capable of producing the draft of a sleeve directly upon the material of the garment without the need of making a pattern first; also able to give the draft of the top and undersleeve side by side i.e. juxtaposed as well as superimposed one on the other in one drafting operation.

The accompanying drawings further explain how the objectives are attained. Briefly the following figures are:

FIG. 5 represents the top sleeve front section member.

FIG. 6 represents the top sleeve back section member.

FIG. 7 represents the top sleeve breast line member.

FIG. 8 represents the joining bracket shown upside down for convenience of display.

In addition to the drawings, a full description of the device and its functions is given below.

Figure 2:
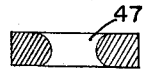
FIG. 2 is a sectional view, and represents a possible type of tongue and groove adaptable to the device.
Figure 3:
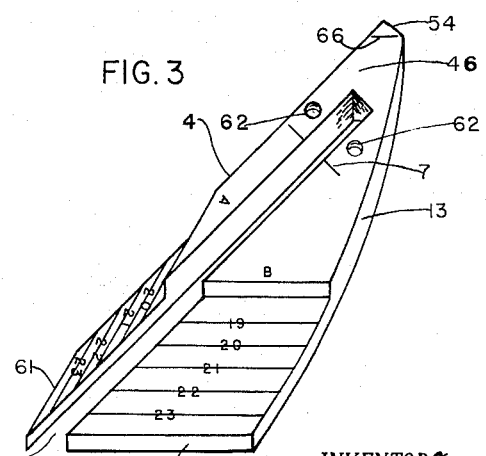
FIG. 3 represents the undersleeve member.

Referring first to FIG. 3 the undersleeve member 46 embodies most of the outline of the undersleeve part of the armhole in a straight edge 4 on one side and a slightly curving edge 54 at the top. Along its other side a long slightly curving edge 13 embodies part of the undersleeve backseam run line. At a straight edge 61 normal to the base edge 20 and joining edge 4 is a scale "A" for gaging the distance, member 46 moves left or right. The indicia of the scale are lines parallel to the edge 61. The base, a straight edge 20 is parallel to the breast line 16 of a garment and has a scale "B" with indicia lines parallel to it. This scale gages the up and down movement of member 46. A groove 47 is cut through the base or edge 20 and runs obliquely into the body of the member towards the top for some distance. This groove may have any design suitable. The type of groove 47 shown in FIG. 2 is among the suitable. It consists of a groove with convex edges into which would fit a tongue with concave edges. At the appropriate location a straight line 7 extends normally from the edges of the groove 47 to serve as a matching index line for scale "C" of member 11 shown in FIG. 4. A pair of holes 62, one on each side of the groove 47 serves as a handle for moving the member. From edge 20 for some distance the thickness of the member is less than for the rest of the member. The surface on this thinner part is lower and meets the surface of the thicker part forming a vertical edge parallel to edge 20. Member 46 is somewhat triangular in appearance. This thinner part slides under part of the undersleeve breast line member 11 shown in FIG. 4. All markings on member 46 appear on the top and underside so that it can be used for the same purpose when turned upside down for juxtaposing the undersleeve to the top sleeve. When member 46 is used with the top up, the undersleeve may be superimposed on the top sleeve draft. The undersleeve height line 66 is marked across the member near edge 54.

Figure 4:
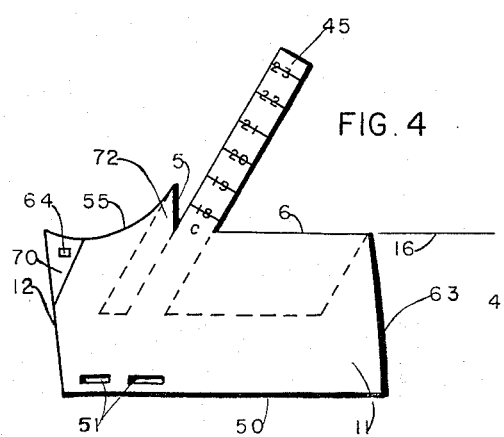
FIG. 4 represents the undersleeve breast line member.

Referring to FIG. 4 the undersleeve breast line member 11 has a long edge 6 parallel to the breast line 16 of a garment as its upper edge which is used as an index for the breast line and also as a scale matching edge for scale "B" of member 46. Parallel to edge 6 is the lower edge 50. A slightly curving edge 63 embodies the backseam run line, another curving edge 12 embodies the inseam run line. A portion 72 between edges 12 and 6 projects from edge 6 and has a curved edge 55 embodying a part of the outline of the undersleeve of the armhole and a straight edge 5 serving as a scale matching index edge for scale "A" of member 46.

Also from edge 6 a wide tongue 45 extends at the same oblique angle as the groove 47 in the undersleeve member 46. A scale "C" with indicia extending to both edges of tongue 45 extends along tongue 45 for cooperating with matching index line 7 of member 46. Scale "C" gages the combined lateral and up and down movement of member 46. Near the intersection of edges 12 and 50 is a pair of short grooves 51 parallel to the breast line index edge 6. When the device is employed as a templet for correctly joining the parts of the sleeve that have already been cut, tongue 56 of member 23 (FIG. 8) is placed in the inner groove 51 in assembling the device. The templet then shows how much the undersleeve and top sleeve must overlap at the inseams at the time of sewing them together. When the device is assembled with tongue 56 placed in the outer groove 51 it serves as a lay out device that juxtaposes the draft of the top and undersleeve. That region under the projecting portion 72 and from edge 6 back under the member 11 under which the undersleeve member 46 will lie is undercut sufficiently far back to accommodate member 46 when it is moved in to indicate the smallest size which the device is designed to delineate. Also a region 70 at the intersection of edges 12 and 55 has its surface lowered below that of the rest of the member enough to accommodate a part of the top sleeve breast line member 25 which it overlaps when member 11 is turned over and 11 and 25 are juxtaposed to be used as a templet. The overlap is a definite amount required and is designed in the device. In the region 70 of lower surface at the intersection of edges 12 and 55 of member 11, is a cylindrical or square opening 64. Since the member 11 must be turned over for use when juxtaposed all markings are on both sides.

Referring to FIG. 5, the top sleeve front section member 31, it is bound on one side by a straight edge 10 which at the top joins to a curved edge 14 which continues around the top and down the opposite side blending into a straight part that continues to the base where a straight edge 18 parallel to the breast line 16 of a garment joins the two edges 10 and 14. Edge 14 embodies most of the outline of the armhole along the front of the top sleeve and also a scale "D" near its lower end. Scale "D" gages the up and down movement of member 31 with respect to the sleeve outline. At the bottom of scale "D" the top sleeve front notch 44 is cut in edge 14. Edge 10 serves as an index edge for scales "F" and "G." Along edge 18 is a scale "E" with indicia lines running parallel to the edge 18. Scale "E" gages the up and down movement of member 31 with respect to the breast line 16. A tongue 32 projects downward from the underside of member 31 and runs obliquely for some distance between the top and edge 18. A swinging arm 33 on top of member 31 is pivoted at one end 34 near the upper extremity of the tongue 32 and at the other end 35 on the fixed arm 24 of member 36 shown in FIG. 6. Parallel to edge 18 the undersleeve height line 66 and the top sleeve height line 67 are marked across member 31 in the upper region. On member 31 along edge 10 and between lines 67 and 66 is located the top sleeve height line reshape deduction scale 73 shown as short lines. The built up parts 68 of edges of members 31 and 36 of FIG. 6 lie between the respective edges and the dash lines parallel to the respective edges.

Referring to FIG. 6 the top sleeve back section member 36, it is bound by a straight edge 48 on one side having a scale "F" with indicia lines parallel to the edge 48 for gaging the horizontal movement of member 36 with respect to the backseam. Edge 48 meets at the top a curved edge 15 embodying the outline of the armhole along the back part of the top sleeve which joins to a slightly curving edge 17 embodying part of the top sleeve backseam run lin which joins to a straight base edge 19 having a scale "E" along it for gaging the up and down movement of member 36 with respect to the breast line 16. Edge 19 is parallel to the breast line 16. Edge 48 extends under edge 10 of member 31 even when the members 31 and 36 are at their maximum separation so that member 31 will always ride over 36 when they are moved closer. A tongue 37 projects downward from the underside of member 36 and runs obliquely for some distance between the top and edge 19 but at a smaller angle than the angle of tongue 32 of member 31 when measured counter clockwise between the breast line 16 and the tongue 37. A fixed arm 24 raised above the surface of member 36 is rigidly attached to member 36 over the tongue 37 far enough from edge 48 to allow member 31 to pass under arm 24 and over member 36 as members 31 and 36 are moved closer together. Arm 24 extends in line with tongue 37 across and beyond edge 19 far enough to engage in a groove 30 of member 25 shown in FIG. 7. At or near its loose end arm 24 has an expanded part 53 having an index edge 38 for matching with scale "H" of member 25 shown in FIG. 7. Also at the loose end of arm 24 is a tongue 41 projecting downward from the underside and in line with arm 24 which operates also in groove 30 of member 25. A handle 39 also at the loose end of arm 24 serves for moving member 36 along groove 30 of member 25. The top sleeve height line 67 and the undersleeve height line 66 are marked across the member parallel to edge 19 and in the upper region of the member.

Members 31 and 36 are made of a thinner material than the top sleeve breast line member 25 so that they may slide easily over member 25 and 31 over 36, however such parts of the edges of members 31 and 36 as do not have to slide over any part of the device are built up on the underside as indicated by 68 so that the edges embodying the outline will be in contact with the material.

Referring to FIG. 7 the top sleeve breast line member 25, it has a long straight edge 9 parallel to the breast line 16 of a garment which serves as an index edge for the breast line 16 and scale "E." A scale "G" in the middle section of edge 9, when matched with edge 10 of member 31 serves to gage the horizontal movement of members 31 and 36, with respect to the armhole outline and the backseam run line position. One end of edge 9 joins to a short slightly curving edge 17 which embodies part of the top sleeve backseam run line. The other end is joined to a short curving edge 1 embodying the top sleeve inseam run line. Edges 1 and 17 join to a long straight edge 49 parallel to edge 9 as the lower edge. Near the intersection of edges 1 and 49 is a short groove 52 parallel to the breast line 16 for receiving a tongue 59 of the joining bracket 23 shown in FIG. 8. A series of lines 3 normal to edge 9 locates the position of the sleeve width line for the various sizes. Near the inseam run line edge 1 a portion 26 of member 25 projects beyond edge 9 and has a curved edge 60 embodying part of the front section armhole outline and a straight edge 8 parallel to the breast line 16 used as a scale matching index edge for scale "D" of member 31. The sleeve balance line 2 passing through the intersection of edges 60 and 8 is marked normal to edge 9. The region 71 between edges 1 and 60 has its surface lowered to accommodate the region 70 between edges 12 and 55 of member 11. In the region 71 of lower surface between edges 1 and 60 is a cylindrical or square tongue 65 to lock in the opening 64 of member 11, when the assembly is juxtaposed as a templet. Parallel to and to the right of line 2 is the undersleeve line 43. To the right of line 43 and running obliquely is marked the undersleeve inseam run line 40 which intersects line 43 at edge 9. Two wide strips 27 and 29 to the right of the projecting portion 26 extend outward from the breast line index edge 9 at the same oblique angles as the tongues 32 and 37 of members 31 and 36 respectively. Strips 27 and 29 have grooves 28 and 30 cut parallel to them. Tongue 32 runs in groove 28 and tongue 37 in groove 30. Grooves 28 and 30 extend past edge 9 and into the main body of member 25 for some distance. A scale "H" is located along that part of groove 30 that is cut in the main body of member 25. Scale "H" gages the combined vertical-horizontal movement of members 31 and 36 with respect to the top sleeve armhole outline.

Referring to FIG. 8 the joining bracket member 23, it is elongated and undercut through most of its width. For convenience of displaying it, it is shown upside down. The thinner part 57 is the undercut part which on the underside forms a right angle edge 69 along a straight line with the thicker part 58. Two tongues 56 shorter and 59 longer parallel to the long axis of the bracket i.e. parallel to the breast line 16 project from the underside of the undercut thinner part 57 for engaging the members 11 and 25 in the grooves 51 and 52, while the edge 69 formed by the undercut between the thinner part 57 and the thicker part 58 butts to the lower edges 50 and 49 of members 11 and 25 respectively.

Figure 1:
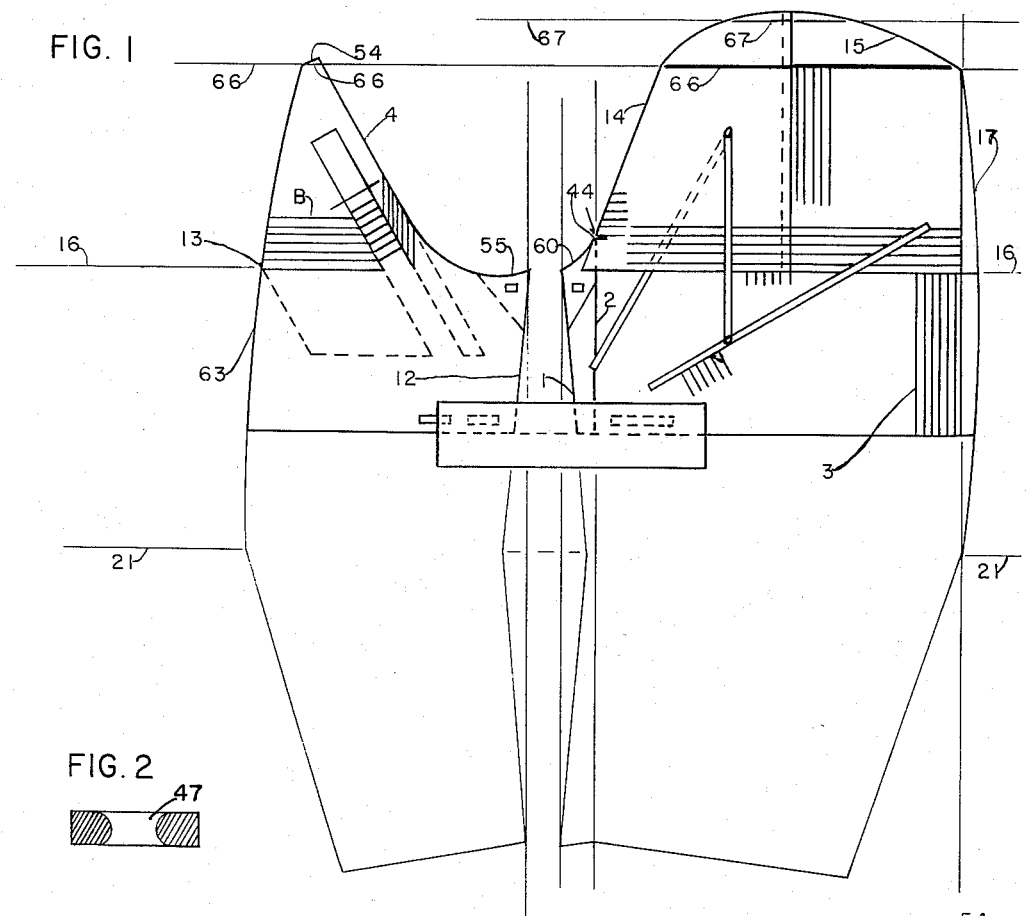
FIG. 1 is a plan view of the entire device in operative position as combined for use in drafting an undersleeve juxtaposed to a top sleeve both of size 48.

Referring to FIG. 1 the entire device is shown in operative position as combined for use in drafting an undersleeve juxtaposed to a top sleeve both of size 48. To obtain the draft of the two parts of the sleeve, a tracing is made along edges 63, 13, 54, 4, 55, and 12 for the undersleeve. Edges 63 and 12 are prolonged to the elbow line 21 and the balance of that part of the sleeve is drawn without instrument because of its simplicity. For the top sleeve part, a tracing is made along edges 1, 60, 14, 15 and 17. Edges 1 and 17 are prolonged to the elbow line 21 and the balance of the sleeve is drawn without instrument. A check is placed at the top sleeve front notch 44, and lines 2, 67, 66, and the appropriate one of 3 may be projected on the draft. If a size smaller than 48 is to be drafted the proper reshape reduction is marked before the tracing is begun.

The need for this improvement has been voiced repeatedly. It is well known that various modifications in structures, mode of operation, assembly and manner of use may and often do occur to those skilled in the art, especially after benefiting from the teachings of the invention, therefore it will be understood that this disclosure is illustrative of some preferred means of embodying the invention in useful form.

We claim:

1. A device for laying out sleeves comprised of a combination of six members, two of which embody the outline of the undersleeve while three others embody the outline of the topsleeve and the sixth member being a joining bracket for linking the undersleeve members to the top sleeve members for using the combination as a templet and as a layout device, one of said members embodying the undersleeve outline being the undersleeve member and having a convex curved edge embodying part of the undersleeve backseam run line, said convex edge joining a shorter convex curved edge embodying a portion of the armhole outline, said shorter convex curved edge joining a straight edge embodying part of the armhole outline of the undersleeve, joining another straight edge having a scale with indicia lines parallel to the edge for gaging the left and right movement of the said undersleeve member, said last mentioned straight edge being perpendicular to another straight edge parallel to the breast line of a garment and having also a scale with indicia lines parallel to the edge for gaging the vertical movement of the undersleeve member and joined to the longer convex curved edge, said scale parallel to the straight edge parallel to the breast line of a garment used for gaging the vertical movement of the said undersleeve member; said undersleeve member having an oblique groove cut between the two straight edges perpendicular to each other, that part of the undersleeve member having the scale indices being undercut and thinner than the rest of the member whereby the undercut part may slide under another member, a line parallel to the edge parallel to the breast line of a garment marked near the shorter convex curved edge for indicating the location of the undersleeve height line, a line extending normally from the edges of the oblique groove marked on the thicker part of the undersleeve member for matching with a scale, and said undersleeve member having a pair of holes passing through the thicker part of the undersleeve member for manipulating the said member.

2. A device for laying out sleeves as in claim 1, the other member embodying the outline of the undersleeve being the undersleeve breast line member having a convex curved edge embodying the backseam run line opposite a very flat convex curved edge embodying the undersleeve inseam run line, said convex curved edges joined at their bottom end by a lower straight edge parallel to the breast line of a garment, said very flat convex curved edge joined at its other end by a concaved curved edge, said convex curved edge opposite the very flat convex curved edge joined at its other end by an upper straight edge parallel to the breast line of a garment, said concaved curved edge joined at its other end by a straight edge normal to the upper straight edge parallel to the breast line of a garment, said concaved curved edge embodying a part of the outline of the undersleeve armhole, said straight edge normal to the upper straight edge parallel to the breast line of a garment being a scale matching edge cooperating with the indicia of the scale gaging the left-right movement of the undersleeve member, said upper straight edge parallel to the breast line of a garment embodying the breast line and being also a scale matching edge cooperating with the indicia of the scale gaging the vertical movement of the undersleeve member, a rectangular elongated section with a scale thereon extending obliquely beyond the upper straight edge parallel to the breast line of a garment, said obliquity of the extending rectangular section being the same as the obliquity of the groove in the undersleeve member, said scale on the said rectangular extending section having indicia normal to the long edge of the rectangular extending section for measuring the combined horizontal-vertical movement of the undersleeve member in cooperation with said line on the undersleeve member extending normally from the edges of the oblique groove, a pair of grooves parallel to the upper straight edge parallel to the breast line of a garment located near the intersection of the very flat convex curved edge and the lower straight edge, a parallelogramic section undercut inward from the upper straight edge into which the undercut part of the undersleeve member may slide, a triangular region at the intersection of the very flat convex curved edge and the concaved curved edge having its surface lowered so that it is half the thickness of the undersleeve breast line member, and an opening cut in the triangular region having its surface lowered.

3. A device for laying out sleeves as in claim 2, one of said members embodying the outline of the top sleeve being the top sleeve front section member and having a lower straight edge parallel to the breast line of a garment joined at one end to a straight edge normal to the lower straight edge, the other end of the straight edge normal to the lower straight edge joined to a convex curving edge which blends into a straight edge obliquely meeting the lower straight edge parallel to the breast line of a garment, a scale at the lower straight edge with indicia parallel to the said edge for gaging the vertical motion of the said top sleeve front section member with respect to the breast line, a tongue projecting down from the underside of the top sleeve front section member and running obliquely towards the lower straight edge parallel to the breast line of a garment, a scale along the straight edge obliquely meeting the lower straight edge for gaging the vertical motion of the top sleeve front section member with respect to the front outline of the top sleeve; said convex curving edge which blends into a straight edge obliquely meeting the lower straight edge embodying some of the outline of the armhole along the front of the top sleeve, a longitudinal built up part as a support partly along the underside, the top sleeve notch cut in the said edge just below the scale along the said edge; said top sleeve front section member having also in the region with the curved edge the top sleeve height line and the undersleeve height line marked across its face parallel to the lower straight edge parallel to the breast line of a garment, a top sleeve height line reduction scale between the top sleeve and undersleeve height lines marked along the straight edge normal to the lower straight edge, said straight edge normal to the lower straight edge being also a scale matching index edge, a swinging arm pivoted at one end to the face of said top sleeve front section member and extending beyond the member, and said swinging arm having means for pivoting its free end to another arm.

4. A device for laying out sleeves as in claim 3, one of said members embodying the outline of the top sleeve being the top sleeve back section member and having a lower straight edge parallel to the breast line of a garment and joined at one end by a convex arc edge joined to another convex arc edge opposite the lower straight edge and joined to a straight edge normal to the lower straight edge parallel to the breast line of a garment, said straight edge normal to the lower straight edge having a scale with indicia parallel to the edge for gaging the horizontal movement of the top sleeve back section member with respect to the back seam; a scale at the lower straight edge with indicia parallel to the edge for gaging the vertical movement of the top sleeve back section member with respect to the breast line of a garment, said convex arc edge opposite the lower straight edge embodying the outline of the armhole along the back part of the top sleeve and having on the underside a longitudinal built up part as support, said convex arc edge joined to the lower straight edge embodying part of the top sleeve back seam run line and having a longitudinal built up part as support partly along the underside, said top sleeve back section member having also the sleeve width line marked normal to the lower straight edge and intersecting the two convex arc edges where they join, the top sleeve height line and the undersleeve height line marked across its face parallel to the lower straight edge, a tongue projecting down from the underside and running obliquely towards the lower straight edge but at a different angle to the angle of the tongue in the top sleeve front section member, a fixed arm fastened to the face and projecting beyond the lower straight edge at the same oblique angle as the tongue, said fixed arm having at its loose end an expanded part having an index edge for matching with a scale, a tongue projecting down from the underside and in line with the arm, means for attaching to another arm, a handle projecting upwards, said swinging arm of the top sleeve front section member when pivoted at its free end to the fixed arm of the top sleeve back section member causing the front section member to move synchronously with the back section member when the fixed arm is moved, and said front section member sliding on the back section member.

5. A device for laying out sleeves as in claim 4, one of said members embodying the outline of the top sleeve being the top sleeve breast line member and having a straight lower edge parallel to the breast line of a garment, a longer and shorter upper edge also parallel to the breast line of a garment, said upper longer edge being an index edge for the breast line and a scale matching edge for matching with the scale along the lower straight edge of the top sleeve front and back section members, a scale about midway along said longer upper straight edge of the top sleeve breast line member for gaging the horizontal movement of the top sleeve front and back section members with respect to the position of the armhole outline and the backseam run line, a convex curved edge joining the two parallel straight lower and longer upper edges and embodying part of the outline of the top sleeve backseam run line; a very flat concave curved edge opposite the convex edge and extending from the lower straight edge joined to a shorter concave edge joined to a shorter straight edge parallel to the longer upper straight edge, joined to a short straight edge joined normally to the longer upper straight edge, a series of sleeve width lines extending normally from the longer upper to the lower straight edge marked near the convex curved edge; two rectangular strips projecting at different oblique angles from the longer upper straight edge parallel to the breast line of a garment, said rectangular projecting strips having grooves in them cut parallel to the strips and extending into the main body of the top sleeve breast line member, said oblique angles and grooves of said projecting strips corresponding to the oblique angle and width of the tongues of the top sleeve front and back section members, a scale on the main body along one of the grooves for gaging the combined vertical-horizontal movement of the top sleeve front and back section members with respect to the top sleeve armhole outline, said very flat concave curved edge joined to the lower straight edge embodying the top sleeve inseam run line, the sleeve balance line marked from the intersection of the upper shorter straight edge and a concave edge to the lower straight edge, the undersleeve line marked to the right and parallel to the sleeve balance line, the undersleeve inseam run line marked obliquely to the right of the undersleeve line and intersecting the undersleeve line at the longer upper straight edge, said shorter upper straight edge being a scale matching edge for matching with the scale along the edge of the front section member embodying the armhole outline, a groove parallel to the lower straight edge cut near the intersection of the lower straight edge and the very flat concave edge, a region of lower surface at the intersection of the two concave edges, and a tongue projecting upwards from the region of lower surface at the intersection of the two concave edges.

6. A device for laying out sleeves as in claim 5, including a joining bracket for linking the undersleeve members to the top sleeve members and having two long parallel straight edges at right angles to two shorter parallel straight edges, and being undercut parallel to the long edges so as to form two parallel horizontal faces each in a different plane, the face in the lower plane being wider and having a tongue parallel to the long edge located near each of the shorter edges of the member projecting vertically from the face, one of said tongues being longer than the other for engaging the top and undersleeve breast line members, said parallel horizontal faces joined by a vertical face forming a right angle between them, and the thicker part of the bracket serving as a backstop for the lower edge of the top sleeve and undersleeve breast line members.

7. A device for laying out sleeves as in claim 1, consisting of two members synchronously moving horizontally towards each other, one overlapping the other, both of said members synchronously moving horizontally towards each other also synchronously moving obliquely on a third member to produce the layout of the top sleeve, a fourth member moving obliquely on a fifth member to produce the layout of the undersleeve, said members producing the layout of the top sleeve linked to the members producing the layout of the undersleeve by a joining bracket member and by a tongue in an opening at a location where a part of a member of the undersleeve group overlaps a part of a member of the top sleeve group.

References Cited in the file of this patent

UNITED STATES PATENTS

| | | |
|---|---|---|
| 943,130 | Webster | Dec. 14, 1907 |
| 1,601,985 | Sniegocki | Oct. 5, 1926 |
| 2,814,878 | Kolthoff | Dec. 3, 1957 |
| 2,818,649 | Kolthoff | Jan. 7, 1958 |
| 2,826,815 | Kolthoff | Mar. 18, 1958 |
| 2,855,675 | Kolthoff | Oct. 14, 1958 |
| 2,855,676 | Kolthoff | Oct. 14, 1958 |